Oct. 18, 1960

S. R. RICH 2,956,538

DIAPHRAGM VIBRATION CONTROL

Filed Dec. 10, 1957

INVENTOR.

BY Stanley R. Rich

ATTORNEY

United States Patent Office 2,956,538
Patented Oct. 18, 1960

2,956,538

DIAPHRAGM VIBRATION CONTROL

Stanley R. Rich, West Hartford, Conn., assignor to The General Ultrasonics Company, a corporation of Connecticut Filed Dec. 10, 1957, Ser. No. 701,891

10 Claims. (Cl. 116—137)

This invention relates to mechanical vibrators involving the use of diaphragms, and more particularly to the control of transverse vibrations in diaphragms.

Many useful forms of mechanical vibrators involve the use of a transducer of elastic waves in combination with a diaphragm. If the diaphragm is so compliant that it is relatively incapable of sustaining flexural vibrations such combinations can function quite efficiently. On the other hand, if it is desired to use a diaphragm of any substantial stiffness, flexural vibrations can be expected to occur in the diaphragm, traveling away from the region to which the transducer is coupled. These flexural vibrations represent energy losses in an unwanted vibrational mode, and can cause serious losses, which may injure the equipment, especially when high-power vibrational energy is employed. It is to the correction of these deficiencies that my present invention is addressed.

According to my invention, means are provided to prevent flexural vibrations from travelling more than one-quarter wave (in the flexural mode) away from the region in the diaphragm to which the transducer is coupled. Such means can be a body coupled to the diaphragm to damp the flexural vibrations. Alternatively, a body dimensioned to function as an infinite impedance to the flexural vibrations can be employed. As another alternative, an inertial mass may be used. Structures embodying my invention will be more particularly described in the following description of certain embodiments thereof. The description refers to the accompanying drawing, wherein:

Figure 1:
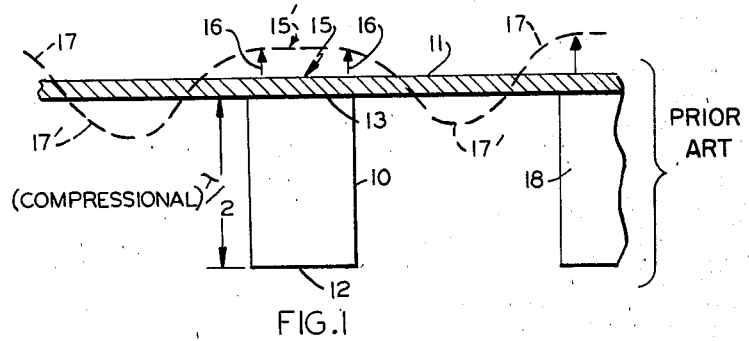
Fig. 1 is a partial elevation and section showing a structure which is old in the art and does not include my invention, and which is illustrated only to illustrate more clearly the problem to which the invention is addressed.

Referring to Fig. 1, a transducer 10 of the kind designed to vibrate as a one-half wave longitudinal vibrator, is coupled to a diaphragm 11 within a portion or region 15 of the diaphragm coextensive with the area of the end 13 of the vibrator 10. During vibration in a longitudinal mode, the ends 12 and 13 of the transducer will alternately move toward and away from each other at the vibration frequency, and the portion 15 of the diaphragm which is coupled to one end 13 will move with it. During one half-cycle of this motion the portion 15 of the diaphragm will move in the direction of the arrows 16, and that portion will advance to a new position 15', illustrated by a dotted line. If we now consider that the portion 15 of the diaphragm which is coupled to the transducer 10 is being alternately "advanced" and "retarded" (not shown) by the transducer during vibration, we see that the region of the diaphragm immediately adjacent the transducer 10 is being moved transversely to the diaphragm at the transducer frequency. This action sets up transverse vibrations in the diaphragm. The frequency of the transverse vibrations will be the same as that of the transducer, and the wave length will be a function of the unit mass and stiffness of the diaphragm 11. Dotted line curves 17 are an instantaneous illustration of such transverse waves. The flat or straight series of dashes at 15' between the arrows 16, 16 indicate that the diaphragm does not flex over the face of the end surface 13 of the vibrator 10.

The troughs 17' of the transverse waves in the diaphragm, being substantially 180 degrees out of phase with the portion 15 coupled to the transducer 10, will radiate energy out of phase with the energy being radiated by those portions of the diaphragm directly over the transducer 10. The present invention is directed to the substantial elimination of the troughs 17'.

In structures employing a plurality of transducers arrayed over a surface of the diaphragm, one or more wave lengths of transverse vibration may exist in the diaphragm between transducers, depending upon the frequency of vibration, distance between transducers, and the mass and stiffness of the diaphragm itself. In Fig. 1 a second transducer is partly shown at 18, and a condition in which a single transverse wave occurs in the diaphragm between the two transducers 10 and 18 is shown.

Figure 2:
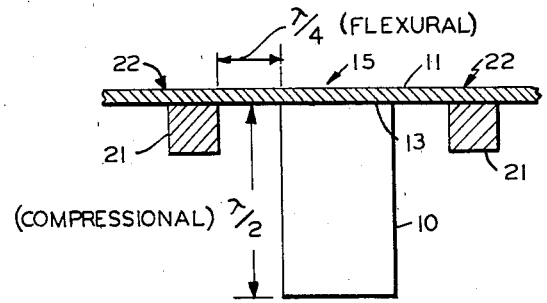
Fig. 2 is a partial elevation and section of a structure embodying my invention.

Referring now to Fig. 2, where elements which are similar to elements of Fig. 1 bear the same reference characters, transverse mode vibration suppressor elements 21 are coupled to the diaphragm each within a region 22 which is essentially one-quarter wave length of transverse mode vibration away from the region 15 which is coupled to the transducer 10. The mode suppressors 21 may be made of a heavy material such as lead, in which case their inertia is effective substantially to prevent the diaphragm from moving during vibration, in the regions 22 coupled to them. The effect of this arrangement is explained with the aid of Fig. 3.

Figure 3:
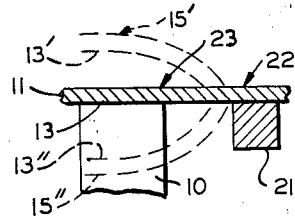
Fig. 3 is a fragmentary view partly in section illustrating the principle of my invention.

In Fig. 3, only the end 13 of the transducer 10 which is coupled to the diaphragm 11 is shown. The dotted line 13' illustrates the position of this end when the transducer is in its condition of maximum elongation, while the dotted line 13" illustrates the position of this end when the transducer is fully contracted. In these conditions, the portion 15 of the diaphragm 11 coupled to the transducer is respectively advanced to position 15' and retarded to position 15". During vibration of the diaphragm transversely between these two positions, the portion 22 of the diaphragm which is coupled to the mode suppressor 21 essentially does not move, it can be considered to be effectively anchored. The portion 23 of the diaphragm which is located between the confronting edges of the transducer 10 and the mode suppressor 21 behaves as though it were a reed anchored at one end to the mode suppressor 21 and free at the other end. Substantially no flexural mode waves will exist in the diaphragm beyond the anchored region.

The mode suppressors can be vibration damping elements or infinite impedance elements, as well as inertial elements. If they are damping elements, they will be made of a material which absorbs the transverse mode wave energy. Such materials are certain kinds of rubber, asphalt, or plasticized cements. If they are infinite impedance elements, they should be one or an odd number of quarter wave lengths long to compressional wave energy, in the direction away from the diaphragm, in which case by reflection at their free ends they will have the effect of inhibiting transverse mode wave motions of the diaphragm in the region 22 coupled to them.

Figure 4:
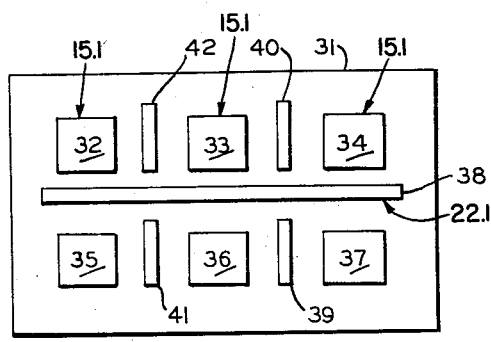
Fig. 4 is a plan view, on a reduced scale, of a combined multiple-transducer and single-diaphragm structure employing my invention.

My invention can be employed with multiple transducer arrays on a single diaphragm in the manner illustrated in Fig. 4. Shown in plan view are a diaphragm 31 on which six transducers 32–37, inclusive, are arrayed, each coupled to the diaphragm within an individual region 15.1 corresponding to the region 15 in Fig. 1. These transducers are spaced-apart, as illustrated in Fig. 1, so that at least one full wave length of transverse mode vibrations can exist between them in the diaphragm during operation. Suppression of the transverse mode is afforded by mode suppressors 38, 39, 40, 41 and 42, coupled to the diaphragm within individual regions 22.1 between adjacent transducers, as shown. I have tried this arrangement using lead mode suppressors and have found a tremendous increase in efficiency of the array configuration illustrated, and a very marked reduction in the cavitation which formerly occurred on the diaphragm between adjacent transducers.

Figure 5:
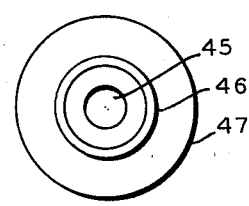
Fig. 5 is a plan view of a circular structure embodying my invention.

Fig. 5 illustrates a transducer and diaphragm combination employing a round (e.g. cylindrical) transducer 45 and a ring shaped mode suppressor 46, in combination with a diaphragm 47, which may, but need not be, circular in shape. A vertical section through Fig. 5 might in many respects look like Fig. 2.

The foregoing are but a few illustrations of my invention. Many other embodiments will occur to those skilled in the art. For example, the diaphragm may be crimped or relieved in the region close to the transducers, and the mode suppressors coupled to it beyond the crimped or relieved region, in order to provide even more the effect of free transducers to the load while retaining the benefits of the diaphragm. The mode suppressors need not be coupled to the same side of the diaphragm as the transducers, but this will obviously be convenient in many cases. The manner of coupling the mode suppressors to the diaphragm is not necessarily different from the manner of coupling the transducers themselves. For example, methods of coupling as described and illustrated in my copending application Serial No. 653,945 and U.S. Patent 2,873,392, may be used.

What I claim is:

1. Mechanical vibrator system comprising a fixed frequency vibrator, a flexural diaphragm capable of being vibrated at said fixed frequency, means coupling said vibrator to said diaphragm within a first region of said diaphragm, and vibration control means acoustically coupled to said diaphragm within a second region of said diaphragm, all parts of said second region being spaced at least one-quarter flexural wavelength away from said first region.

2. System according to claim 1 in which said first and second regions are each rectangular in shape.

3. System according to claim 2 comprising a plurality of said fixed frequency vibrators and an equal plurality of said first regions of said diaphragm, said first regions being separated from each other at least one flexural wavelength of vibration of said diaphragm at said fixed frequency, means coupling each of said vibrators to said diaphragm within an individual one of said first regions, a plurality of said second regions located one between each adjacent pair of said first regions, and a plurality of said vibration control means each coupled to said diaphragm within an individual one of said second regions.

4. System according to claim 3 in which each of said vibration control means is a rib-form element in contact with said diaphragm within one of said second regions.

5. System according to claim 1 in which said first region is circular and said second region is annular and is disposed concentrically about said first region.

6. System according to claim 1 in which said vibration control means is a vibration damping material.

7. System according to claim 1 in which said vibration control means is an inertial mass.

8. System according to claim 1 in which said vibrator control means is a rib-form element of elastic wave transmissive material extending away from said diaphragm substantially an odd number of quarter wavelengths of compressional wave energy in said element at said fixed frequency.

9. System according to claim 1 in which said vibrator control means is a rib-form element made of a material which is relatively softer and denser than the material of said diaphragm.

10. System according to claim 1 in which said vibrator is a compressional wave vibrator.

References Cited in the file of this patent

UNITED STATES PATENTS

| 1,450,287 | Hahnemann | Apr. 3, 1923 |
| 1,589,962 | Hecht | June 22, 1926 |

FOREIGN PATENTS

| 37,616 | Norway | Aug. 6, 1923 |
| 37,617 | Norway | Aug. 6, 1923 |